Feb. 28, 1967   J. SHAPIRO   3,305,996
PANEL FASTENER

Filed May 4, 1964   2 Sheets-Sheet 1

INVENTOR.
JOSEPH SHAPIRO
BY
ATTORNEY

INVENTOR.
JOSEPH SHAPIRO

ATTORNEY

United States Patent Office 3,305,996
Patented Feb. 28, 1967

3,305,996
PANEL FASTENER
Joseph Shapiro, Pomona, Calif., assignor to
North American Aviation, Inc.
Filed May 4, 1964, Ser. No. 364,419
9 Claims. (Cl. 52—617)

This invention relates to a fastening means; and more particularly to a fastening means for use with lightweight cellular panels. The invention described herein was made in the performance of work under a NASA contract, and is subject to the provisions of the National Aeronautics and Space Act of 1958, Public Law 85–568 (72 Stat. 426; 42 U.S.C. 2451), as amended.

*Introduction*

Presently-used lightweight cellular panels generally comprise a sandwich-type construction; the outer portions comprising flat skin-sheets, while the inner portion comprises a so-called "low density" core. Usually, the core is formed of thin sheet material that has been corrugated, or otherwise formed, to produce hexagonal or wedge-like cells that may be either air-filled or foam-filled—the hexagonal-cell panel frequently being called a honeycomb. The resultant panel is extremely lightweight, and very strong.

Fasteners for attaching external members such as brackets, electronic equipment, or other components, to the various types of cellular panels are generally of two types, namely (1) fasteners that are attached to the panel by mechanical means and (2) fasteners that are attached to the panel by adhesives, each fastener having a hole or stud for attaching an external member thereto.

A disadvantage of most mechanical-type fasteners is that they cannot be secured to a panel without causing deformation of the panel's skin sheets and undesirable crushing of the panel's core at the point of attachment, both of which reduce the panel's strength. Since the adhesive-attached fastener obviates deformation or dimpling of the surface of a lightweight panel, it is frequently preferred as a means for attaching external members to the panel.

A disadvantage of prior-art adhesive-attached fasteners will be apparent from the following discussion. Installation of an adhesive-attached fastener in a lightweight panel is usually effected by cutting a hole through one of the panel's skin sheets, and into the core, this hole being of a diameter sufficiently large to accommodate the fastener. Tools known as keyway and fly-cutters are frequently used to form the hole. During the hole-forming operation, the tool of necessity cuts through and removes certain cell walls. It frequently leaves small portions of a cell in one area and leaves large portions of a cell in other areas. For convenience, the term "ruptured cell" will be used to designate the remaining portions of the cut cells. The fastener is then inserted in the hole in the core, leading to the designation "fastener-insert," and a suitable anchoring compound, such as a hardenable epoxy resin, is injected into the space between the fastener-insert and the surrounding core in order to anchor the insert in place. This injection is usually accomplished by forcing a liquid or viscous anchoring material through a small hole either in an external flange on the insert or in the adjacent portion of the skin sheet.

Obviously there is conisderably difficulty in selecting a suitable filling-pressure for the many different types of cores utilized in lightweight panels. For example, when an insert is to be installed in a panel having thin core walls, the anchoring compound must necessarily be injected under low pressure to avoid breaking or distorting the cells of the core; and it has been found that under such circumstances the low filling-pressure may not be sufficient to ensure complete filling of the space between the core walls, insert, and panel skin sheets. It is apparent that if the anchoring compound does not completely fill the recess in which the insert is located, the insert will not be securely anchored to the panel, and vibration of the structural member attached to the panel by means of the insert can quickly cause the insert to loosen and fail as a fastening means. On the other hand, it has been found that excessive filling-pressure can rupture the walls of the core material, and crush the adjacent cells, in which case the amount of anchoring compound inadvertently injected to the crushed cells can affect the anchoring of the insert, the panel's weight, its strength, and its reliability.

*Objects and drawings*

It is therefore an object of the present invention to provide a fastening means for attaching objects to a lightweight panel without adversely affecting the structural characteristics of the panel.

It is an additional object of the invention to provide a fastening means which may be used to attach components to a lightweight panel without causing deformation of its skin sheets and core, and which minimizes changes in the structural characteristics and configuration of the panel core resulting from installation of the fastening means therein.

It is a further object of the invention to provide a fastener of the insert type that can be anchored in a lightweight panel by means of a predetermined, substantially invariant amount of anchoring material.

It is still another object of the invention to provide a high strength-to-weight fastening means for use with sandwich type panels.

Other objects and advantages will become apparent in the following specification and appended drawings in which.

*Synopsis*

In carrying out the principles of this invention in accordance with a preferred embodiment thereof, at least one of the skin sheets is pierced with a hole of sufficiently large diameter to permit insertion of the fastener insert, the hole communicating with an enlarged recess formed in the core. A strip of resilient material is radially contratced, as by being tightly wound, clock-spring fashion, and inserted through the hole into the enlarged recess, whereupon it unwinds to expand radially and forms a barrier that lines the recess and seals off the ruptured cells. Thus, the volume established by the barrier liner is fixed, depending only on the height of the core, and on the diameter of the recess; and being independent of the size, number, and volume of the ruptured cells. The fastener-insert is then positioned in the recess, and a pre-determined pre-measured amount of hardenable anchoring material is placed in the volume between the insert and the liner. In this way the soldified anchoring material forms a unitary structure of the insert, the barrier liner, and the inner surfaces of the skin sheets.

Description of the invention

Figure 1:
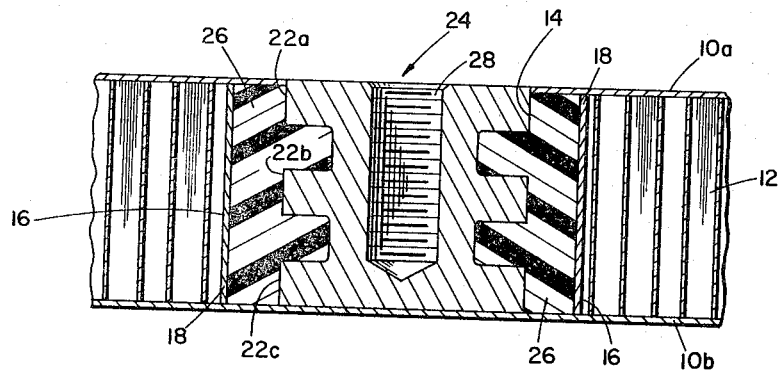
FIG. 1 is a sectional view illustrating a fastening means that constitutes a preferred embodiment of the invention.
Figure 2:
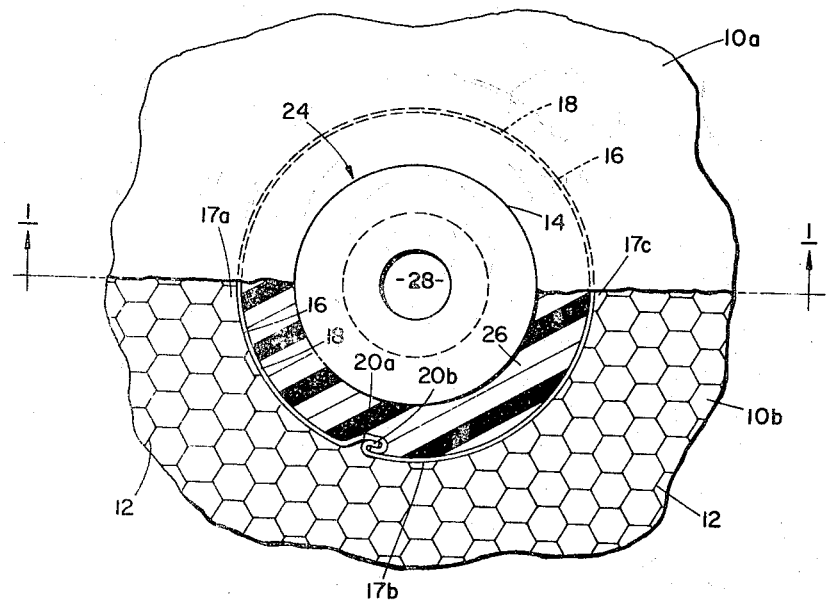
FIG. 2 is a plan view of the embodiment of FIG. 1, a portion of one skin sheet of the lightweight panel in which the fastening means is secured being cut away to show more clearly the arrangement of the embodiment.

In FIG. 1 there is illustrated a cross-sectional view of a lightweight panel of honeycomb construction. the panel comprised of two skin sheets 10a and 10b, between which is suitably secured and sandwiched a low-density honeycomb core 12. A hole 14 is formed in sheet 10a, as by drilling; and an enlarged counterbored recess 16 is formed in the honeycomb core 12, the diameter of recess 16 being determined by the desired load bearing area of the insert-type fastener. As previously described, the recess-forming process produces different-sized ruptured cells, as illustrated in FIG. 2 at 17a, 17b, and 17c. Thus, recess 16 will have an irregularly enlarged diameter at various points around its perimeter; and—in prior art arrangements— the volume of the recess and its associated ruptured cells would tend to vary considerably for various panels having different sized cells, even when the recess is formed with the same cutting tool.

The prior-art variation in volume means that the amount of anchoring compound is not constant, so that its forced injection is necessary, thus leading to the danger of poor installation of the fastener-insert, and the accompanying danger of crushing and weakened cells.

Figure 3:
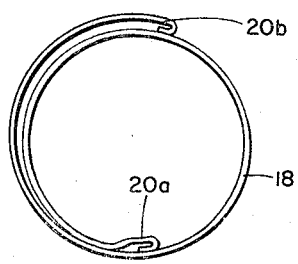
FIG. 3 is a plan view of a component of the embodiment of FIG. 1, illustrating the component in a tightly-rolled configuration of reduced diameter.

In accordance with the present inventive concept, however, this volume is maintained constant, this result being achieved by means of the barrier 18 shown in FIG. 3. Barrier 18 takes the form of a strip of resilient material such as aluminum or plastic; barrier 18 having—in one embodiment—U-shaped lips 20a, 20b formed at its end, the lips facing opposite sides of the barrier. Since barrier 18 is formed of resilient material, it can be tightly rolled as illustrated in FIG. 3, so that its diameter is smaller than the diameter of hole 14; whereup it may pass through aperture 14 in sheet 10a into recess 16. After insertion, the barrier 18 expands to the position illustrated in FIGS. 1 and 2. As can be seen in FIG. 2, the length of barrier 18 is such that the lips 20 interlock when the diameter of the barrier 18 is the same as the diameter of recess 16; and, as may be seen in FIG. 1, the width of barrier 18 is equal to the core height, or the distance between the inner surfaces of skin sheets 10a and 10b, so that the edges of barrier 18 are adjacent skin sheets 10a and 10b. Thus barrier 18 is held in position by the skin sheets and the walls of the ruptured core cells, and forms a sleeve that lines the perimeter of recess 16. It will be readily apparent that the interlocking lips 20a and 20b of barrier 18 will be held together under the spring force which tends to expand the barrier 18, thus creating a tight seal at the interlocked joint.

As previously indicated, when barrier 18 is inserted through the hole 14 in sheet 10a it expands radially, and seals the ruptured honeycomb cells bordering the recess 16. The volume within barrier 18 will therefore be substantially the same for a given recess diameter, regardless of the cell size or the number or size of ruptured cells.

In some cases, it may be advantageous to coat the outer surface of the barrier 18 with a suitable adhesive, such as an epoxy resin, to form a bond between the barrier and the cell walls of the panel core in contact therewith.

Referring again to FIG. 1, it will be seen that hole 14 and recess 16 form a "blind" hole; i.e., a hole without an open bottom. Moreover, the diameter of hole 14 in sheet 10a is approximately the same as the diameter of flanges 22a, 22b, and 22c of an insert 24; permitting insert 24 to be positioned in the blind hole in such a manner that it rests on the lower skin sheet 10b. Moreover, the height of insert 24 may be such that the outer face of flange 22a is substantially flush with the outer surface of sheet 10a when the opposite end of the insert rests on the inner surface of sheet 10b.

After the barrier 18 is positioned within recess 16, but before the insert is positioned, a measured and predetermined amount of liquid anchoring-compound 26 is placed within the area of the barrier, so that when the insert 24 is subsequently placed therein, the anchoring-compound will completely fill the space bounded by the barrier, insert, and panel skin sheets. End flanges 22a, 22, and the intermediate flange 22b of the insert interact with the anchoring-compound 26 to anchor the insert 24 in a fixed position within the recess 16; and the pressure of the anchoring-compound additionally assures the interlocking and sealing of lips 20a and 20b. A small aperture (not shown) may be formed in either the skin sheet 10a or in the end flange 22a of insert 24 to allow the escape of air from recess 16 when the insert is placed therein. Subsequent hardening of the anchoring-compound rigidly locks the assembly in place.

The anchoring-compound may alternatively be injected into the recess after the barrier 18 and insert 24 have been positioned, in which case the barrier 18 will prevent core damage that, in conventional installation techniques, normally results from the pressure required for injection of the anchoring-compound.

It will be understood by those skilled in the art that the anchoring-compound 26 may be of many types, such as for example a "potting" compound comprising an epoxy resin, and a polyamide curing agent mixed in suitable proportions with a metallic oxide to provide higher strength.

Attachment of external member to the insert 24, and thus to the panel, can be accomplished by means of a bolt (not shown) threadedly engaged with a hole 28 located in insert 24.

In some instances, it may be desirable to extend hole 28 through insert 24, and through the lower skin sheet 10b, so that a bolt can be passed completely through the panel for attaching objects thereto. Generally, this extension of the hole 28 will most conveniently be accomplished after the anchoring-compound and insert have been placed in recess 16, and the compound has solidified.

However, it will be readily apparent that the procedure may be varied, and that a hole may be first formed in the lower skin sheet 10b, and temporarily blocked during the placement of the anchoring-compound and insert in recess 16.

Figure 4:
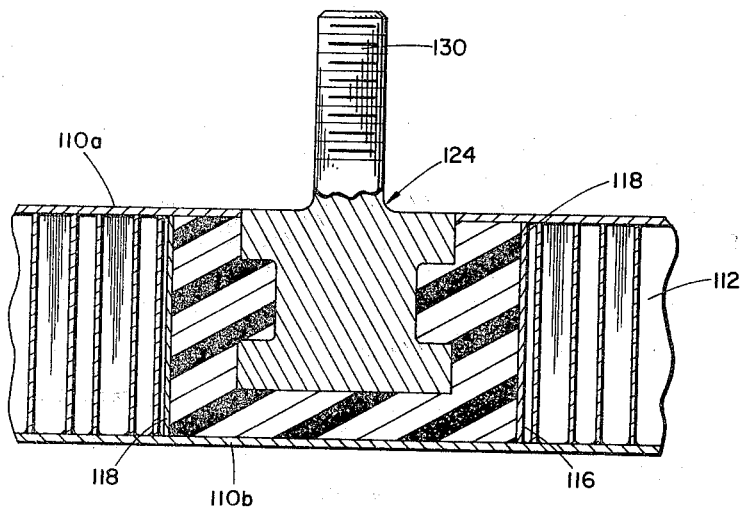
FIG. 4 is a sectional view illustrating a fastening means that constitutes a second embodiment of the invention.
Figure 5:
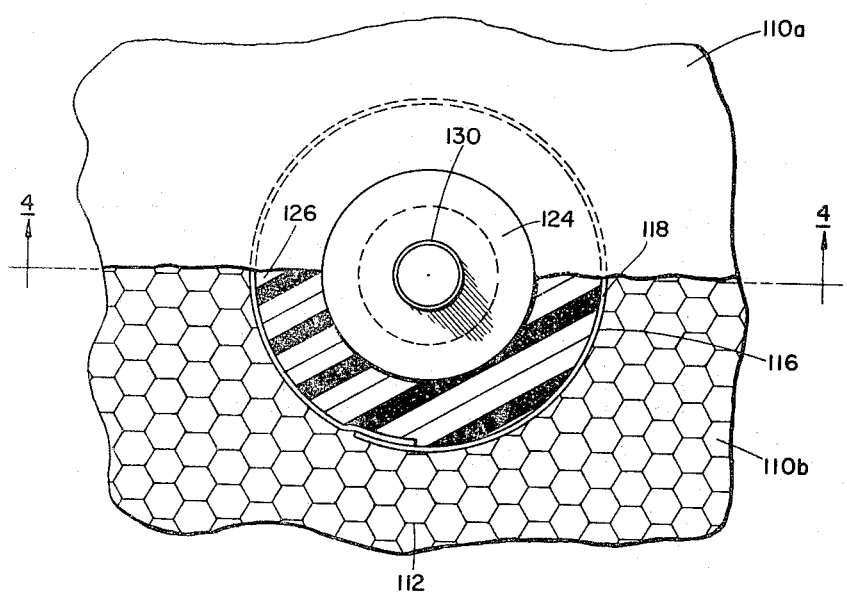
FIG. 5 is a plan view of the embodiment of FIG. 4, a portion of one skin sheet of the lightweight panel in which the fastening means is secured being cut away to show more clearly the arrangement of the embodiment.

FIGS. 4 and 5 illustrate a second embodiment of the invention. As can be seen in FIG. 4, insert 124 does not have to extend to the lower sheet of the panel, its upper flange being a pressure-fit into the hole in the upper skin sheet 110a. This arrangement permits the anchoring-compound to contact the bottom of insert 124; and in some cases provides better adhesion, and a distribution of the force applied to the lower skin sheet 110b. Insert 124 is provided with a threaded stud 130, rather than a threaded hole, for attachment of external parts to the panel.

FIG. 5 shows a barrier 118 that, instead of having interlocking lips, merely has a length slightly greater than the perimeter of recess 116, the ends of barrier 118 being overlapped to form a seal. Barrier 118, is also installed by being coiled tightly so that it can be inserted through the hole 114 in sheet 110a, whereupon the barrier expands against the core 112 and seal the exposed ruptured cells. Like the first embodiment, the second embodiment of the invention can also be locked in the panel by use of a substantially uniform amount of anchoring material 126 placed within barrier sleeve 118.

The present inventive concept lends itself to mass production techniques, since the barriers can be sheets of material that are cut to suitable widths as needed, the various widths being selectable for the core-height of particular panels.

Several advantages are obtained by means of the present invention. Firstly, it provides a distortion-free fastening means. Secondly, it does not crush or weaken the panel. Thirdly, it obviates the weight of excessively-large amounts of anchoring-compound. Fourthly, it eliminates the danger of wall-crushing by excessively high filling-pressures. Fifthly, it eliminates the danger of voids between the insert and the panel. And finally, the barrier, insert, and anchoring-compound act as a stiffener that increases the strength of the panel at the point where the insert is installed.

Although the invention has been described and illustrated in detail, it is to be clearly understood that the same is by way of illustration and example only, and is not to be taken by way of limitation; the spirit and scope of this inventioin being limited only by the terms of the appended claims.

What is claimed is:

1. In combination with a fastener installation for a panel having a low-density honeycomb core secured to and between a pair of skin sheets, an aperture in one of the sheets, and an enlarged right-cylindrical recess in the core, said enlarged recess having a diameter larger than the diameter of said aperture, and being bounded by ruptured cells, the improvement comprising:

means, comprising a substantially right-cylindrical, barrier sleeve of strip-like resilient material positioned in, and lining the enlarged core recess defined by said ruptured cells and having a width substantially equal to the distance between mutually facing surfaces of the skin sheets, said resilient sleeve being radially contractable to be inserted through said aperture, and being radially expansible to line the recess, for forming a predetermined-volume substantially right-cylindrical cavity for minimizing the entry of a hardenable substantially-liquid anchoring material into said ruptured cells—whereby only a given weight and volume of said anchoring material is used, and said anchoring material is confined within the bounds of said barrier to minimize undesired shifting of the center of gravity of said panel.

2. The combination of claim 1, wherein said barrier is expendable, and has interlocked ends limiting radial expansion and the volume enclosed by said barrier sleeve.

3. The combination of claim 1, wherein said barrier is expendable, and has ends circumferentially overlapping each other to limit the volume enclosed by said barrier to a predetermined magnitude.

4. A fastening combination comprising:
   a honeycomb panel member formed with an aperture having an enlarged diameter substantially right-cylindrical recess located internally of the member, said recess normally being bounded by ruptured cells;
   means, comprising a right-cylindrical barrier-strip, positioned in and adjacent the perimeter of said enlarged portion, for confining a hardenable material within the bounds of said barrier strip for preventing said hardenable material from entering said ruptured cells;
   a fastener-insert positioned in the recess and spaced from said barrier; and
   an anchoring material filling the space between the insert and the barrier and bonding together said insert and said panel.

5. In combination with a panel including skin sheets and a low-density honeycomb core secured thereto and sandwiched therebetween, said panel having a hole of a first diameter formed in one of said sheets and a substantially right-cylindrical recess of a second diameter larger than said first diameter formed in said core and extending between said sheets in communication with said hole in said one sheet, said recess being normally bounded by ruptured cells of said honeycomb core, the combination comprising:

means, comprising a radially-expansible substantially right-cylindrical barrier disposed within said recess, each edge of said barrier disposed adjacent the inner surface of a respective one of said sheets, and the outer periphery of said barrier being disposed adjacent the innermost portion of said ruptured cells, for forming a substantially right-cylindrical cavity for anchoring material;
   an insert having one end disposed in said hole in said one sheet so as to close said hole; and
   an anchoring body of solidified material confined within the space bounded by the barrier, the insert, and the skin sheets, and excluded from said ruptured cells, for bonding together said insert and said panel, whereby said barrier minimizes the presence of solidified material in said ruptured cells.

6. The combination of claim 5 wherein said barrier comprises a strip of resilient material having a U-shaped lip at each end thereof, said lips being interlocked with each other for forming a right-cylindrical shell of known volume that remains in said recess.

7. The combination of claim 5 wherein said barrier comprises a strip of resilient material having overlapped ends for forming a right-cylindrical shell of known volume that remains in said recess.

8. The method of installing a potted fastener in a sandwich type panel having a honeycomb core secured between skin sheets, comprising the steps of:
   forming a hole through one skin sheet;
   forming an enlarged right-cylindrical recess in said core, said recess communicating with said hole, being bound by ruptured cells, and having a diameter larger than the diameter of said hole;
   spirally compressing a resilient barrier sleeve to a diameter smaller than the diameter of said hole;
   inserting said spirally compressed barrier sleeve through the hole in the skin sheet; and
   allowing the barrier sleeve to expand spirally to line the enlarged recess in the core to form a right-cylindrical cavity bounded by said right-cylindrical barrier and said skin sheets.

9. The method of installing a potted fastener in a sandwich-type panel having a honeycomb core secured between skin sheets, comprising the steps of:
   forming a hole through one skin sheet;
   forming an enlarged right-cylindrical recess in said core, said recess communicating with, and being symmetrical with, said hole, being bounded by ruptured cells, and having a diameter larger than the diameter of said hole;
   spirally compressing a resilient barrier sleeve to a diameter smaller than the diameter of said hole;
   inserting said spirally compressed barrier sleeve through the hole in the skin sheet;
   allowing the barrier sleeve to expand spirally to line the enlarged recess in the core;
   inserting through the hole, and within the expanded barrier sleeve, a predetermined amount of anchoring-compound;
   inserting into the hole, and within the expanded barrier sleeve, a flanged fastener-insert—whereby the anchoring-compound flows into the space between the fastener-insert, the flanges, and the barrier.

References Cited by the Examiner

UNITED STATES PATENTS

| 1,879,319 | 9/1932 | Kleitz | 52—378 |
| 3,035,375 | 5/1962 | Williams | 52—744 |
| 3,108,404 | 10/1963 | Lamb | 52—704 |

FOREIGN PATENTS 1,312,264  11/1962  France.

RICHARD W. COOKE, JR., *Primary Examiner.*